United States Patent
Kikuchi et al.

(10) Patent No.: US 9,948,196 B2
(45) Date of Patent: Apr. 17, 2018

(54) INSULATION-TYPE SYNCHRONOUS DC/DC CONVERTER

(71) Applicant: ROHM CO., LTD., Ukyo-ku, Kyoto (JP)

(72) Inventors: Hiroki Kikuchi, Kyoto (JP); Ryo Shimizu, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 70 days.

(21) Appl. No.: 14/843,399

(22) Filed: Sep. 2, 2015

(65) Prior Publication Data
US 2016/0072399 A1    Mar. 10, 2016

(30) Foreign Application Priority Data

Sep. 5, 2014  (JP) ................................. 2014-181616
May 20, 2015  (JP) ................................. 2015-103095

(51) Int. Cl.
*H02M 3/335* (2006.01)
*H02M 1/32* (2007.01)

(52) U.S. Cl.
CPC ......... *H02M 3/33592* (2013.01); *H02M 1/32* (2013.01); *H02M 3/33523* (2013.01); *Y02B 70/1475* (2013.01)

(58) Field of Classification Search
None
See application file for complete search history.

(56) References Cited

U.S. PATENT DOCUMENTS

| 5,991,172 A * | 11/1999 | Jovanovic | H02M 1/4258 363/132 |
| 6,198,638 B1 * | 3/2001 | Lee | H02M 1/38 363/21.14 |
| 2009/0257250 A1 * | 10/2009 | Liu | H02M 3/33592 363/21.06 |
| 2013/0027987 A1 * | 1/2013 | Yang | H02M 3/33592 363/21.14 |
| 2015/0229149 A1 * | 8/2015 | Fahlenkamp | H02J 7/0044 320/114 |

FOREIGN PATENT DOCUMENTS

JP        2010074959 A        4/2010

* cited by examiner

*Primary Examiner* — Nguyen Tran
*Assistant Examiner* — Monica Mata
(74) *Attorney, Agent, or Firm* — Cantor Colburn LLP

(57) ABSTRACT

The synchronous rectifier controller is provided at the secondary side of the insulation-type synchronous DC/DC converter and controls the synchronous rectifier transistor. The controller is coupled to the output of the feedback photo coupler and drives the switching transistor according to the feedback signal. The synchronous rectifier controller includes a driver circuit and an abnormal detection circuit and is configured as a single module. The driver circuit drives the synchronous rectifier transistor. The abnormal detection circuit detects an abnormal condition in the secondary side of the DC/DC converter. FAIL terminal is coupled to notify outside of an occurrence of the abnormal condition.

19 Claims, 13 Drawing Sheets

INSULATION-TYPE SYNCHRONOUS DC/DC CONVERTER

CROSS-REFERENCE TO RELATED APPLICATIONS

This application claims priority under 35 U.S.C. § 119 to Japanese Patent Application No.2014-181616, filed Sep. 5, 2014 and Japanese Patent Application No.2015-103095, filed May 20, 2015, the entire contents of which are incorporated herein by reference.

BACKGROUND OF THE INVENTION

Field of the Invention

The present invention relates to a DC/DC converter.

Description of the Related Art

Various kinds of home appliances such as TVs, refrigerators etc., each receive externally applied commercial AC electric power for its operation. Also, electronic devices such as laptop computers, cellular phone terminals, and tablet devices are each configured to operate using commercial AC electric power, and/or to be capable of charging a built-in battery using the commercial AC electric power. Such home appliances and electronic devices (which will collectively be referred to as "electronic devices" hereafter) each include a built-in power supply apparatus (converter) configured to convert the commercial AC voltage to DC voltage. Alternatively, such a converter is built into an external power supply adapter (AC adapter) for such an electronic device.

FIG. 1 is a block diagram showing an AC/DC converter 100r investigated by the present inventor. The AC/DC converter 100r mainly includes a filter 102, a rectifier circuit 104, a smoothing capacitor 106, and a DC/DC converter 200r.

The commercial AC voltage $V_{AC}$ is input to the filter 102 via an unshown fuse and an unshown input capacitor. The filter 102 removes noise included in the commercial AC voltage $V_{AC}$. The rectifier circuit 104 is configured as a diode bridge circuit which performs full-wave rectification of the commercial AC voltage $V_{AC}$. The output voltage of the rectifier circuit 104 is smoothed by the smoothing capacitor 106, thereby generating stabilized DC voltage $V_{IN}$.

The insulation-type DC/DC converter 200r receives the DC voltage $V_{IN}$ at its input terminal P1, steps down the DC voltage $V_{IN}$ and supplies an output voltage $V_{OUT}$ stabilized to the target value to a load (not shown) connected to its output terminal P2.

The DC/DC converter 200r includes a primary controller 202, a photo coupler 204, a shunt regulator 206, an output circuit 210, and additional circuit components. The output circuit 210 includes a transformer T1, a diode D1, an output capacitor C1, and a switching transistor M1. The output circuit 210 has a conventional topology, and accordingly, detailed description thereof will be omitted.

With the switching operation of the switching transistor M1, the input voltage $V_{IN}$ is stepped down, and the output voltage $V_{OUT}$ is generated. The controller 202 adjusts the duty ratio of the switching operation of the switching transistor M1 so as to regulate the output voltage $V_{OUT}$ to the target value.

The output voltage $V_{OUT}$ of the DC/DC converter 200r is divided by the resistors R1 and R2. The shunt regulator 206 amplifies an error between the divided voltage (voltage detection signal) $V_S$ and a predetermined reference voltage $V_{REF}$, and draws (sinks) an error current $I_{ERR}$ according to the error from the light emitting device (LED) of the photo coupler 204.

Accordingly, a feedback current $I_{FB}$ flows through the light receiving device (photo transistor) of the photo coupler 204, which corresponds to the error current $I_{ERR}$ at the secondary side. The feedback current $I_{FB}$ is smoothed by a resistor and a capacitor, and is supplied to a feedback (FB) terminal of the controller 202. The controller 202 adjusts the duty cycle of the switching transistor M1 according to a feedback voltage $V_{FB}$ at the FB terminal.

In the insulation type DC/DC converter, an abnormal condition such as an over voltage condition, an overheated condition (thermal abnormal condition), an over current condition may occur in both of the primary side and the secondary side. However, the circuit in FIG. 1 has no function for detecting the abnormal condition in the secondary side, and there is no protection function for the abnormal condition in the secondary side.

SUMMARY OF THE INVENTION

The present invention has been made in order to solve such a problem. Accordingly, it is an exemplary purpose of the present invention to provide a DC/DC converter with functions for detecting the secondary side abnormality and for protecting the circuit in the abnormal condition.

An embodiment of the present invention relates to a synchronous rectifier controller provided on a secondary side of an insulation-type synchronous DC/DC converter. The insulation-type synchronous DC/DC converter supplies power to a load. The DC/DC converter comprises: a transformer having a primary winding and a secondary winding; a switching transistor coupled to the primary winding of the transformer; a synchronous rectifier transistor coupled to the secondary winding of the transformer; a feedback photo coupler; and a primary controller coupled to an output side of the feedback photo coupler, and structured to control the switching transistor according to a feedback signal from the feedback photo coupler. The synchronous rectifier controller comprises: a driver circuit coupled to drive the synchronous rectifier transistor; an abnormal detection circuit structured to assert an abnormal detection signal when an abnormal condition in a secondary side of the DC/DC converter is detected; and a fail terminal for notifying outside of an occurrence of the abnormal condition, and the synchronous rectifier controller is packaged in a single module.

With such an embodiment, the synchronous rectifier controller with a function of detecting the abnormal condition and generating the fail signal indicative of the detection can protect the circuit in cooperation with another IC.

The fail terminal may be coupled to the load. With such an arrangement, the load may stop its operation, and/or reduce its consumption current so as to protect the circuit, in response to the notification indicative the occurrence of the abnormality.

The load may comprise: a microcontroller; and at least one circuit controlled by the microcontroller. The fail terminal may be coupled to the microcontroller. With such an arrangement, the microcontroller may stop a circuit under its control and/or reduce consumption current of the circuit so as to protect the circuit, in response to the notification indicative the occurrence of the abnormality.

In one embodiment, a load switch may be provided on a power supply path from the DC/DC converter to the load, and the fail terminal may be coupled to the load switch. With such an arrangement, the load can be protected by turning off the load switch in the occurrence of the abnormality.

In one embodiment, the DC/DC converter may further comprise an error notifying photo coupler having an output connected to the primary controller. The fail terminal may be coupled to the error notifying photo coupler for notifying the primary controller of the occurrence of the abnormal condition. With such an arrangement, the primary controller may stop the switching operation of the switching transistor and reduce power supplied to the secondary side, in response to the notification indicative the occurrence of the abnormality.

In one embodiment, the synchronous rectifier controller may further comprises: a photo coupler connection terminal coupled to the input side of the feedback photo coupler; and an error amplifier structured to amplify an error between a voltage detection signal according to an output voltage of the DC/DC converter and a target voltage, and to draw a current according to the error from the input side of the photo coupler via the photo coupler connection terminal. The synchronous rectifier controller may be packaged in a single module. With such an arrangement, in stead of a shunt regulator, the error amplifier built-in inside the synchronous rectifier controller generates input current of the photo coupler. Accordingly, the consumption current can be reduced in comparison with the shunt regulator.

A power supply plane of the abnormal detection circuit and a power supply plane of the driver circuit maybe isolated each other, and a ground plane of the abnormal detection circuit and a ground plane of the driver circuit may be isolated each other. Such an arrangement allows the synchronous rectifier transistor to be provided at the high voltage side (output terminal side).

The power supply plane of the error amplifier is supplied with an internal power supply voltage which is generated from a voltage at the photo coupler connection terminal, and the ground plane of the error amplifier may be supplied with a ground voltage at the secondary side of the DC/DC converter.

The synchronous rectifier transistor may be provided at a high voltage side of the secondary winding, and the transformer may further comprise an auxiliary winding provided at a secondary side. The DC/DC converter may be structured to generate, by using the auxiliary winding, an external power supply voltage with reference to a voltage potential at a line connecting the synchronous rectifier transistor to the secondary winding, and the ground plane of the driver circuit maybe supplied with the voltage potential at the line, and the power supply plane of the driver circuit may be supplied with the external power supply voltage.

The error amplifier and the driver circuit may be integrated on separate semiconductor chips. With such an arrangement, high isolation between the error amplifier and the driver circuit can be realized.

The synchronous rectifier controller may further comprise the synchronous rectifier transistor and wherein the synchronous rectifier controller may be packaged in a single module.

In one embodiment, the DC/DC converter may be a flyback converter. In one embodiment, the DC/DC converter may be a forward converter.

Another embodiment relates to an insulation-type synchronous DC/DC converter. The insulation-type synchronous DC/DC converter comprises: a transformer having a primary winding and a secondary winding; a switching transistor coupled to the primary winding of the transformer; a synchronous rectifier transistor coupled to the secondary winding of the transformer; an output capacitor; a feedback photo coupler; a synchronous rectifier controller structured to control the synchronous rectifier transistor and to drive the photo coupler with a current according to an error between the voltage at the output capacitor and a target voltage; and a primary controller coupled to an output side of the feedback photo coupler, and structured to control the switching transistor according to a feedback signal from the feedback photo coupler. The synchronous rectifier controller comprises: a driver circuit coupled to drive the synchronous rectifier transistor; an abnormal detection circuit structured to assert an abnormal detection signal when an abnormal condition in a secondary side of the DC/DC converter is detected; and a fail terminal for notifying outside of an occurrence of the abnormal condition, and the synchronous rectifier controller is packaged in a single module.

Yet another embodiment of the present invention relates to a power supply apparatus (AC/DC converter). The power supply apparatus comprises: a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage, and to supply the DC input voltage thus stepped down to a load.

Yet another embodiment of the present invention relates to an electronic device. The electronic device comprises: a load; a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage, and to supply the DC input voltage thus stepped down to the load.

Yet another embodiment of the present invention relates to an AC adaptor. The AC adapter comprises: a filter structured to filter a commercial AC voltage; a diode rectifier circuit structured to full-wave rectify an output voltage of the filter; a smoothing capacitor coupled to smooth an output voltage of the diode rectifier circuit, so as to generate a DC input voltage; and the aforementioned DC/DC converter configured to step down the DC input voltage so as to generate the DC output voltage.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

(First Embodiment)

Figure 2:
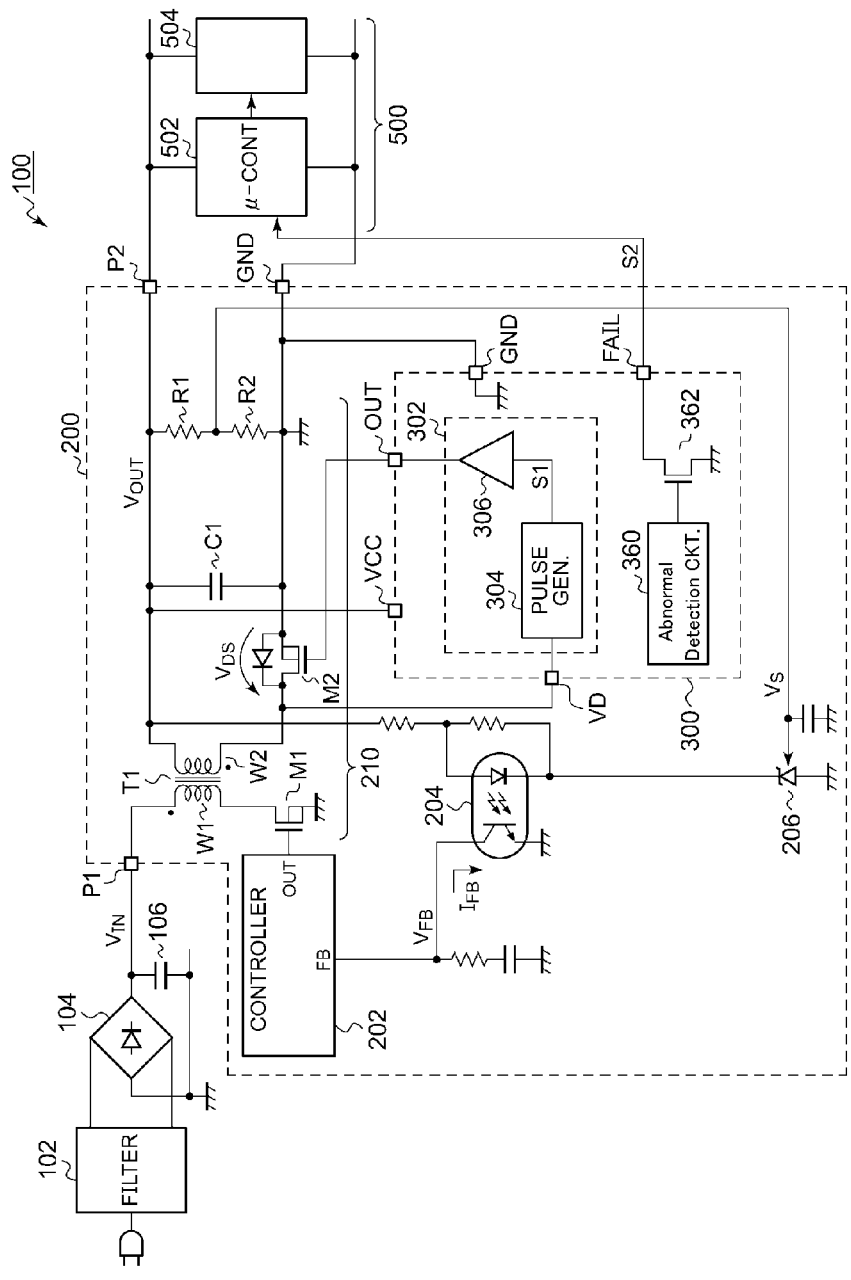
FIG. 2 is a circuit diagram of an AC/DC converter according to a first embodiment.

FIG. 2 is a circuit diagram of an AC/DC converter 100 according to the first embodiment. The AC/DC converter 100 includes a filter 102, a rectifier circuit 104 and an insulation-type DC/DC converter 200.

The DC/DC converter 200 includes a primary controller 202, a photo coupler 204, a shunt regulator 206, an output circuit 210, and a synchronous rectifier controller 300. The output circuit 210 has a topology of a synchronous flyback converter, and includes a transformer T1, a switching transistor M1 coupled to a primary winding W1, a synchronous rectifier transistor M2 coupled to a secondary winding W2, and an output capacitor C1. In this embodiment, the synchronous rectifier transistor M2 is provided at a low voltage side of the secondary winding W2 of the transformer T1 (ground side).

The synchronous rectifier controller 300 is provided at the secondary side of the DC/DC converter 200 and controls the switching operation of the synchronous rectifier transistor M2. The VD (drain) terminal of the synchronous rectifier controller 300 is supplied with the drain voltage $V_D$ of the synchronous rectifier transistor M2. The OUT (output) terminal is coupled to the gate of the synchronous rectifier transistor M2. The synchronous rectifier transistor M2 may be built-in inside the synchronous rectifier controller 300. The VO terminal is coupled to receive a voltage detection signal $V_S$ according to the output voltage $V_{OUT}$. The GND (ground) terminal is coupled to a ground line of the secondary side of the transformer T1.

The synchronous rectifier controller 300 includes a driver circuit 302 and an abnormal detection circuit 360, and is packaged in a single module. The driver circuit 302 drives the synchronous rectifier transistor M2. Specifically, driver circuit 302 includes a pulse generator 304 structured to generate a pulse signal S1, and a driver 306 coupled to drive the synchronous rectifier transistor M2 according to the pulse signal S1.

The configuration of the pulse generator 304, and the method/scheme for generating the pulse signal S1 are not limited. In one embodiment, the pulse generator 304 may generate the pulse signal S1 at least based on a voltage across the synchronous rectifier transistor M2, i.e. a drain-source voltage $V_{DS}$. Specifically, the pulse generator 304 generates the pulse signal S1 according to the drain-source voltage $V_{DS}$ and two negative threshold voltages $V_{TH1}$ and $V_{TH2}$. These two threshold are determined to satisfy a relation of $V_{TH1}<V_{TH2}<0$. For example, $V_{TH1}=-50$ mV, and $V_{TH2}=-10$ mV. The pulse generator 304 sets the pulse signal S1 at one level for turning-on the synchronous rectifier transistor M2 (ON-level, high level for example) when the drain-source voltage $V_{DS}$ becomes lower than the negative first threshold voltage $V_{TH1}$. Then, the pulse generator 304 sets the pulse signal at another level for turning-off the synchronous rectifier transistor M2 (OFF-level, low level for example) when the drain-source voltage $V_{DS}$ becomes higher than the negative second threshold voltage $V_{TH2}$.

The abnormal detection circuit 360 is structured to detect an abnormal condition in the secondary side of the DC/DC converter 200. The abnormal condition may include, but not limited to, over current condition; over voltage condition; and overheated condition. Further, the detection method is not limited. For example, the over voltage condition may be detected by monitoring a voltage at the output line of the DC/DC converter 200 or a voltage at an appropriate node, and comparing the monitored voltage with a threshold voltage. The thermal abnormal condition may be detected by using a thermistor. The over current condition may be detected by comparing the voltage across the synchronous rectifier transistor M2 with a threshold voltage, or by inserting a sense resistor in series with the synchronous rectifier transistor M2 and comparing the voltage drop across the sense resistor with a threshold voltage.

The synchronous rectifier controller 300 is provided with a fail (FAIL) terminal for notifying outside of an occurrence of the abnormal condition detected by the abnormal detection circuit 360. The FAIL terminal has an open-drain/open-collector configuration, and is used for notifying the abnormal condition according to ON/OFF state of a transistor 362 coupled to the FAIL terminal.

The above is the configuration of the DC/DC converter 200. Next, description will be made regarding the operation of the DC/DC converter 200.

The synchronous rectifier transistor M2 is provided with a body diode between its back gate and its drain. Therefore, turning off the synchronous rectifier transistor M2 is insufficient for circuit protection because the DC/DC converter 200 keeps its operation with a rectification with the body diode. In the present embodiment, the synchronous rectifier controller 300 has a function of detecting the abnormal condition and generating the fail signal S2 indicative of the detection, and is provided with the FAIL terminal for notifying outside of the abnormal condition, the synchronous rectifier controller 300 can protect the circuit in cooperation with another IC.

In FIG. 2, FAIL terminal is coupled to the load 500 of the DC/DC converter 200. With such arrangement, the load 500 may stop its operation, and/or reduce its consumption current so as to protect the circuit, in response to the notification S2 indicative the occurrence of the abnormality.

For example, the load 500 includes a micro controller 502 and at least one circuit 504 controlled by the micro controller 502. FAIL terminal is coupled to the micro controller 502. The micro controller 502 stops the circuit 504 under its control and/or reduces consumption current of the circuit 504 so as to protect the circuit 504, in response to the notification S2 indicative the occurrence of the abnormality.

Figure 3:
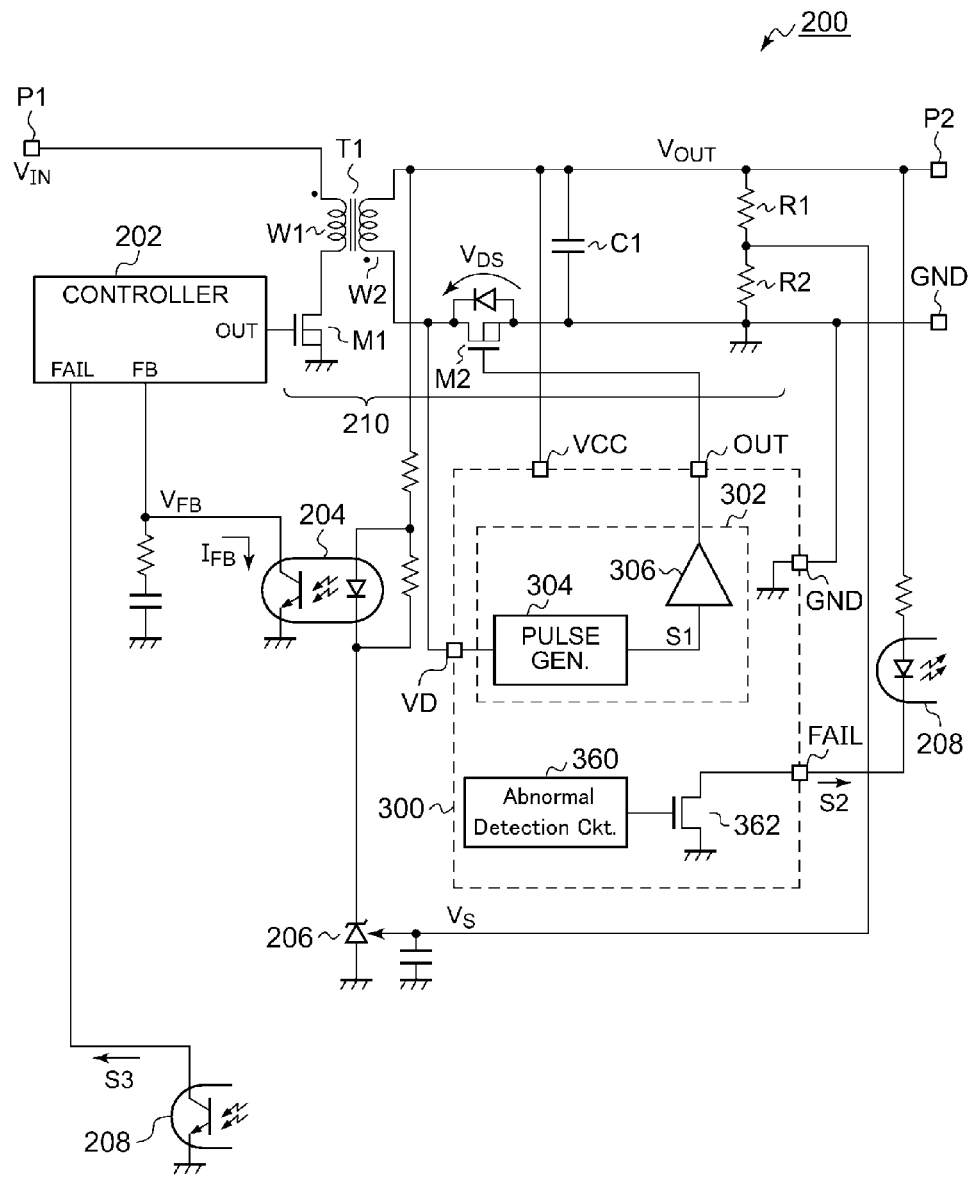
FIG. 3 is a circuit diagram of a specific configuration of the DC/DC converter with the synchronous rectifier controller.

FIG. 3 is a circuit diagram of a specific configuration of the DC/DC converter 200 with the synchronous rectifier controller 300. The DC/DC converter 200 includes an error notifying photo coupler 208 in addition to the photo coupler 204. The light emitting device at the input side of the error notifying photo coupler 208 is coupled to FAIL terminal and the light receiving device at the output side of the error notifying photo coupler 208 is coupled to FAIL terminal of the controller 202.

The FAIL signal S2 output from the FAIL terminal of the synchronous rectifier controller 300 is supplied to the controller 202 via the error notifying photo coupler 208. The primary controller 202 stops the switching operation of the switching transistor M1 or decrease the duty cycle ratio of the switching transistor M1, so as to reduce power supplied to the secondary side of the transformer T1, in response to the notification indicative the occurrence of the abnormality, and the circuit is protected.

Figure 4:
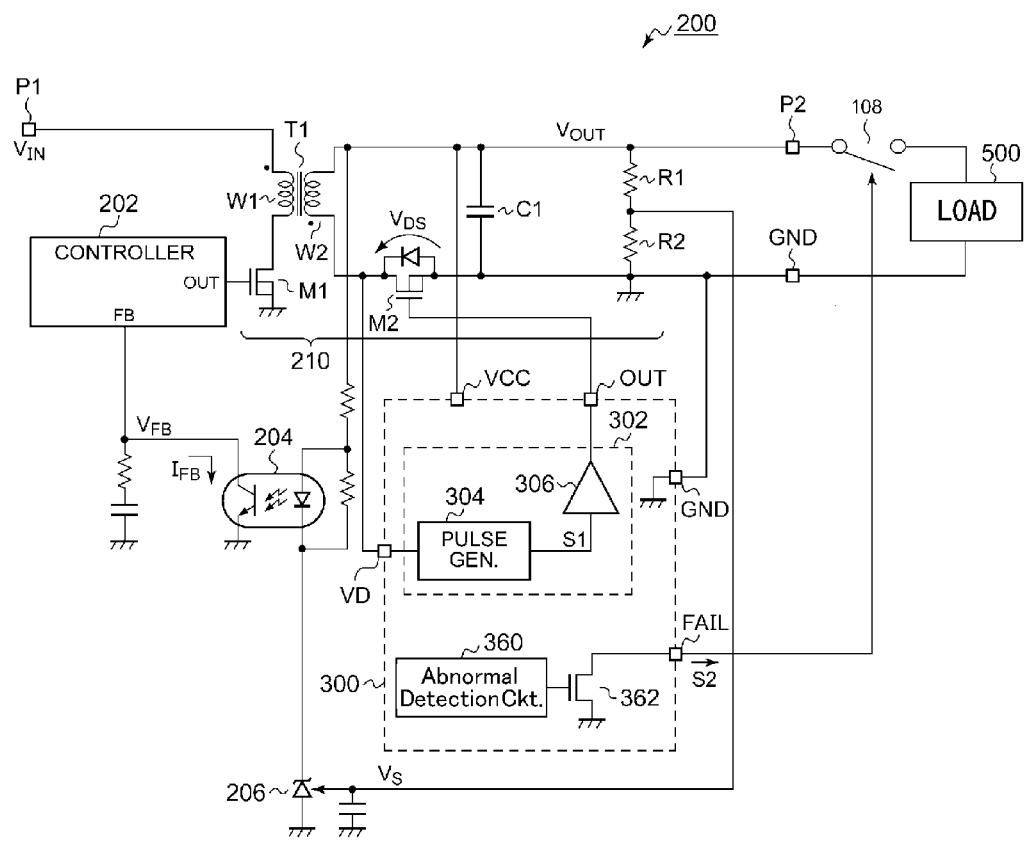
FIG. 4 is a circuit diagram of another specific configuration of the DC/DC converter with the synchronous rectifier controller.

FIG. 4 is a circuit diagram of another specific configuration of the DC/DC converter 200 with the synchronous rectifier controller 300. A load switch 108 is provided on a power supply path from the DC/DC converter 200 to the load 500. For example, the load switch 108 is provided between the output terminal P2 and the load 500 as shown in FIG. 4, or between a node connecting the resistor R1 and the output line and the output terminal P2. The load switch 108 includes MOSFET (Metal Oxide Semiconductor Field Effect Transistor) and its control terminal (Gate) is coupled to the FAIL terminal.

The FAIL signal S2 from the FAIL terminal of the synchronous rectifier controller 300 is input to the control terminal of the load switch 108, and the load switch 108 turns off in response to the notification indicative of the abnormal condition, and the power supply from the DC/DC converter 200 to the load 500 is stopped. Accordingly, the circuit is protected.

Figure 5:
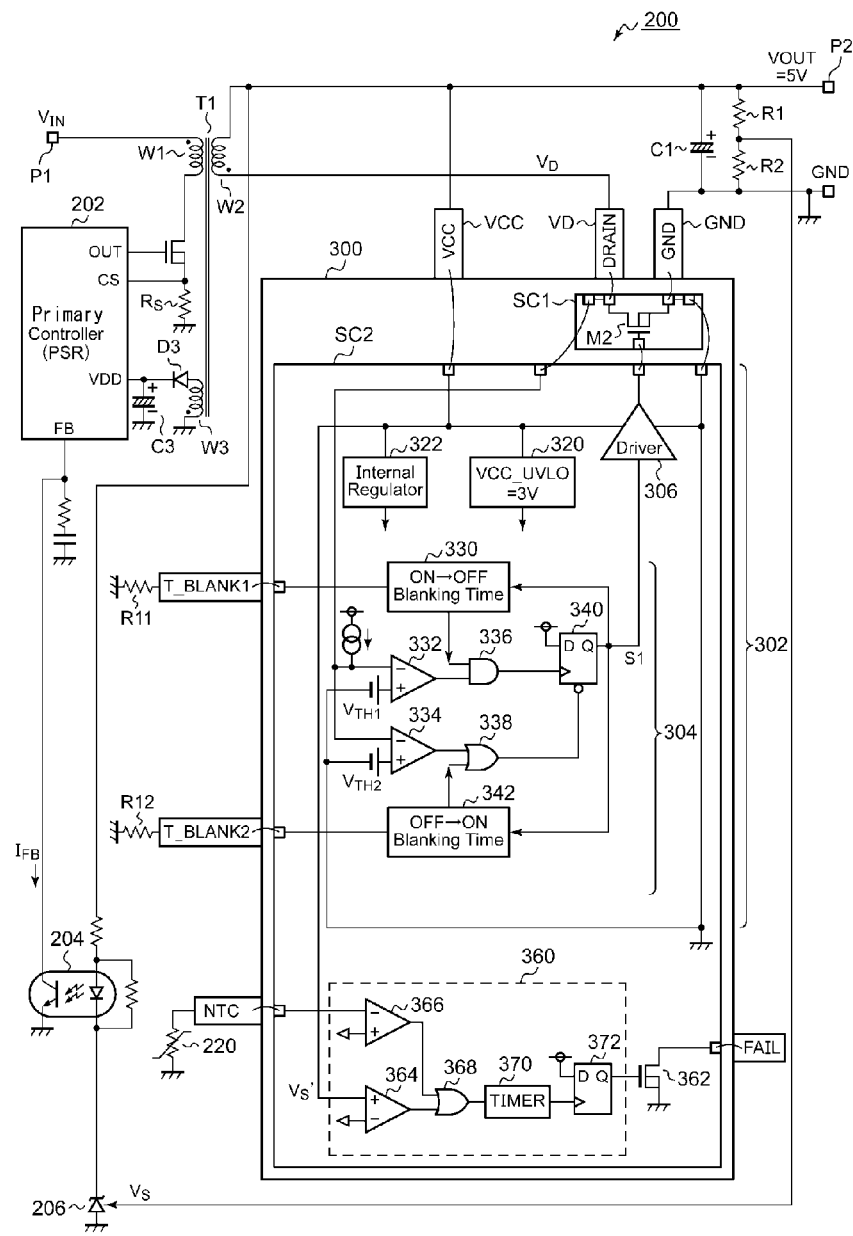
FIG. 5 is a circuit diagram showing a specific configuration of the synchronous rectifier controller.

FIG. 5 is a circuit diagram showing a specific configuration of the synchronous rectifier controller 300. In the primary side of the transformer T1, a sense resistor Rs is provided in series with the switching transistor M1. The controller 202 monitors the primary current based on the voltage drop across the sense resistor Rs. The primary current is utilized in current mode control and/or current protection. The configuration of the controller 202 is not limited and it may configured as a pulse modulator with peak current mode, average current mode, or constant OFF-time mode.

A rectifier diode D3 and a smoothing capacitor C3 are coupled to an auxiliary winding W3, which is provided to the transformer T1. A voltage across the capacitor C3 is supplied to the controller 202 as the power supply voltage.

Next, description will be made below regarding the synchronous rectifier controller 300. The synchronous rectifier transistor M2 is configured as a built-in component of the synchronous rectifier controller 300. The synchronous rectifier controller 300 includes two semiconductor chips (dice) SC1 and SC2. The semiconductor chip SC1 is fabricated with high voltage process and the synchronous rectifier transistor M2 is integrated on the chip SC1. The driver circuit 302, the abnormal detection circuit 360 and the transistor 362 are integrated on the semiconductor chip SC2.

The driver circuit 302 includes an UVLO (Under-Voltage Lockout) circuit 320 and an internal regulator 322 in addition to the pulse generator 304 and the driver 306. The UVLO circuit 320 shuts down the driver circuit 302 when the voltage at VCC terminal becomes lower than a threshold (3V). The internal regulator 322 receives the voltage at the VCC terminal and supplies a regulated voltage to other circuits.

The pulse generator 304 includes a blanking circuit 330, a set comparator 332, a reset comparator 334, an AND gate 336, an OR gate 338, a flip-flop 340, and a blanking circuit 342.

A high voltage clamp circuit (unshown) may be provided between the drain of the synchronous rectifier transistor M2 and the input terminals (−) of the set comparator 332 and the reset comparator 334. The set comparator 332 compares the drain-source voltage $V_{DS}$ of the synchronous rectifier transistor M2 with the first threshold voltage $V_{TH1}$ (=−50 mV). When $V_{DS}<V_{TH1}$, an output of the set comparator 332 is asserted (high-level), an output (pulse signal) S1 of the flip-flop 340 changes to the on-level (high).

The reset comparator 334 compares the drain-source voltage $V_{DS}$ of the synchronous rectifier transistor M2 with the second threshold voltage $V_{TH2}$ (=−10 mV). When $V_{DS}>V_{TH2}$, an output of the reset comparator 334 is asserted (low-level), the flip-flop 340 is reset, and its output S1 changes to off-level (low).

The blanking circuits 330 and 342 masks the set pulse from set comparator 332 and the reset pulse from reset comparator 334 respectively while the drain voltage $V_D$ of the synchronous rectifier transistor M2 fluctuates due to noise. The blanking (mask) periods of the blanking circuits 330 and 342 can be adjusted according to external resistors R11 and R12 coupled to T_BLANK1 terminal and T_BLANK2 terminal respectively. The AND gate 336 generates the logical AND of the set pulse and the output of the blanking circuit 330 so as to mask the set pulse. Similarly, the OR gate 338 generate the logical OR of the reset pulse and the output of the blanking circuit 342 so as to mask the reset pulse.

The FAIL terminal of the synchronous rectifier controller 300 is coupled to the load 500 as shown in FIG. 2 or to the error notifying photo coupler 208 as shown in FIG. 3.

The abnormal detection circuit 360 includes an OVP (Over Voltage Protection) comparator 364, a thermal protection comparator 366, an OR gate 368, a timer 370 and a flip-flop 372. The OVP terminal is supplied with the voltage detection signal $V_S'$ according to the output voltage $V_{OUT}$. The voltage $V_S'$ may be generated by dividing the output voltage $V_{OUT}$ by unshown resistor pair. The OVP comparator 364 compares the voltage $V_S'$ with a predetermined threshold, and asserts its output when it detects the over voltage condition.

The NTC terminal is coupled to a thermistor 220 having an NTC (Negative Temperature Coefficient). The thermistor 220 is disposed in the vicinity of heat generating element such as the synchronous rectifier transistor M2. The thermal protection comparator 366 compares a voltage generated by the thermistor 220 with a predetermined threshold, and asserts its output when it detects the overheat condition. The OR gate 368 generates the logical OR of the output signals of the OVP comparator 364 and the thermal protection comparator 366. The timer 370 applies a trigger to the flip-flop 372 when a period in which the output of the OR gate 368 is asserted exceeds a predetermined time, in otherwise, when any abnormal condition occurs over the predetermined time. The output of the flip-flop 372 transits to high level and the transistor 362 turns on.

The configuration of the abnormal detection circuit 360 is not limited to that of FIG. 5, and the abnormal detection circuit 360 may include either one of the OVP comparator 364 and the thermal protection comparator 366, or may further include other abnormal detecting means. Further, the protection method is not limited to timer-latch protection, and the abnormal detection circuit 360 may utilize an auto restart protection.

(Second Embodiment)

Figure 6:
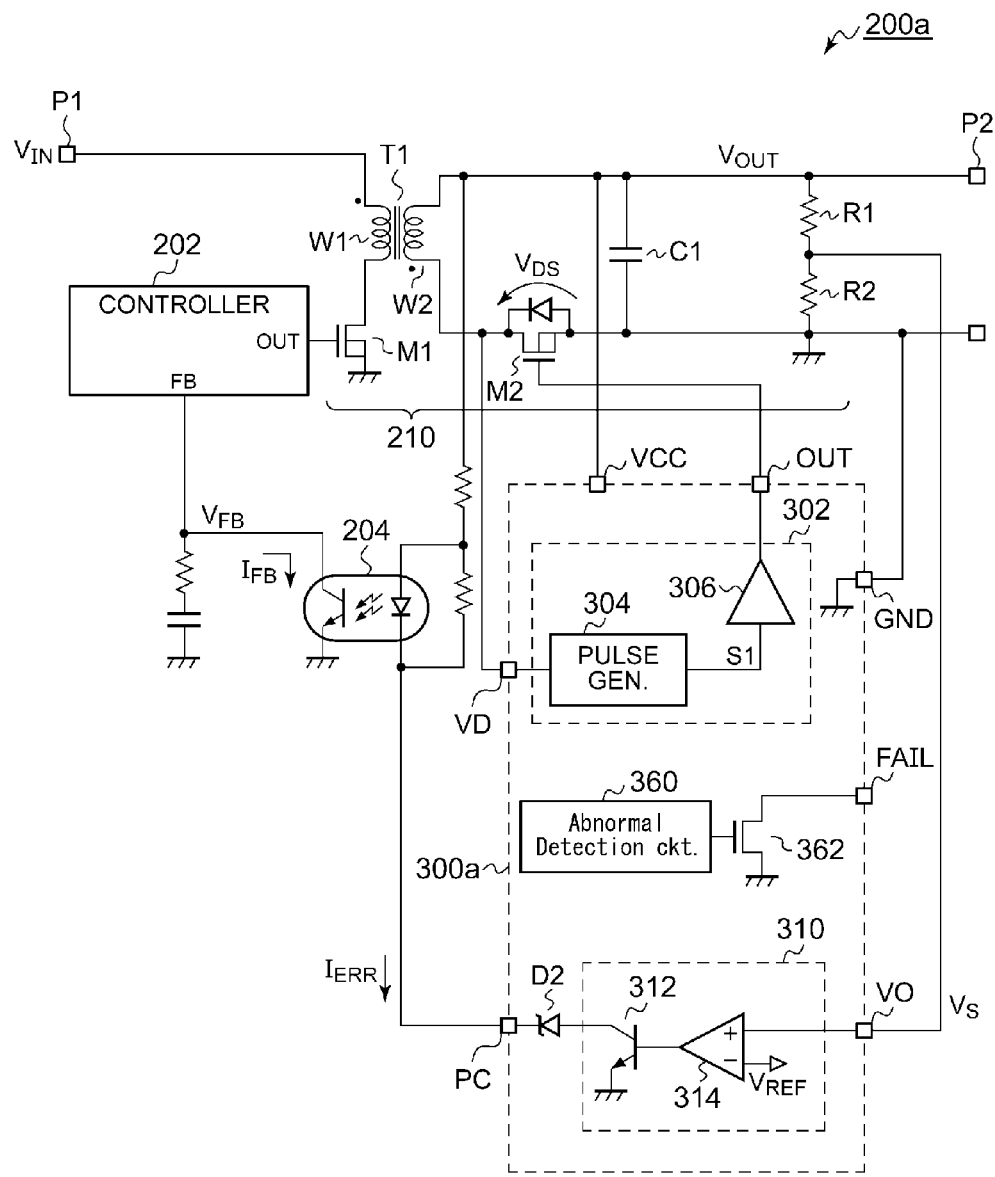
FIG. 6 is a circuit diagram of a DC/DC converter with a synchronous rectifier controller according to a second embodiment.

FIG. 6 is a circuit diagram of a DC/DC converter 200a with a synchronous rectifier controller 300a according to a second embodiment. The synchronous rectifier controller 300a includes an error amplifier 310 and a photo coupler connection (PC) terminal in addition to the synchronous rectifier controller 300 of FIG. 2. The PC terminal is coupled to the light emitting device (LED) of the photo coupler 204.

The error amplifier 310 is coupled to amplify an error between the voltage detection signal $V_S$ according to the output voltage $V_{OUT}$ of the DC/DC converter 200a and its target voltage $V_{REF}$. The error amplifier 310 draws (sinks) an error current $I_{ERR}$ according to the error from an input side of the photo coupler 204 via the PC terminal. The error amplifier 310 has its output stage having open-collector/drain configuration, and a collector/drain of the transistor 312 of the output stage is coupled to the PC terminal. The differential amplifier 314 controls the base current or gate voltage of the transistor 312 based on the error between the voltage detection signal $V_S$ and the reference voltage $V_{REF}$. In the present embodiment, the diode D2 is inserted between the collector of the transistor 312 and the PC terminal for the purpose of a circuit protection and/or voltage level shift. In one embodiment, the diode D2 may be omitted.

The above is the configuration of the DC/DC converter 200a including the synchronous rectifier controller 300a. Next, description will be made regarding the operation of the DC/DC converter 200a.

The voltage detection signal $V_S$ becomes higher than the reference voltage $V_{REF}$, then the error current $I_{ERR}$ drawn by the transistor 312 increases and the feedback current $I_{FB}$ flowing through the photo transistor of the photo coupler 204. The feedback voltage $V_{FB}$ falls, and the duty cycle ratio (on-period) of the switching transistor M1 decreases and the voltage detection signal $V_S$ changes in one direction (fall) so as to match the reference voltage $V_{REF}$ with feedback. Conversely, the voltage detection signal $V_S$ becomes lower than the reference voltage $V_{REF}$, then the error current $I_{ERR}$ drawn by the output transistor 312 decreases and the feedback current $I_{FB}$ flowing through the light receiving device. When the feedback voltage $V_{FB}$ raises, the duty cycle ratio (on-period) of the switching transistor M1 increases and the voltage detection signal $V_S$ changes in the other direction (raise) so as to match the reference voltage $V_{REF}$ by feedback control. Accordingly, the output voltage $V_{OUT}$ of the DC/DC converter 200 is maintain at its target level.

The DC/DC converter 200a provides the following advantage. In the synchronous rectifier controller 300a, the error amplifier 310 is integrated on the same semiconductor chip on which the driver circuit 302 is integrated, and this reduces the current consumption of the error amplifier 310 in comparison with that of the shunt regulator 206 in FIG. 1 significantly.

Figure 1:
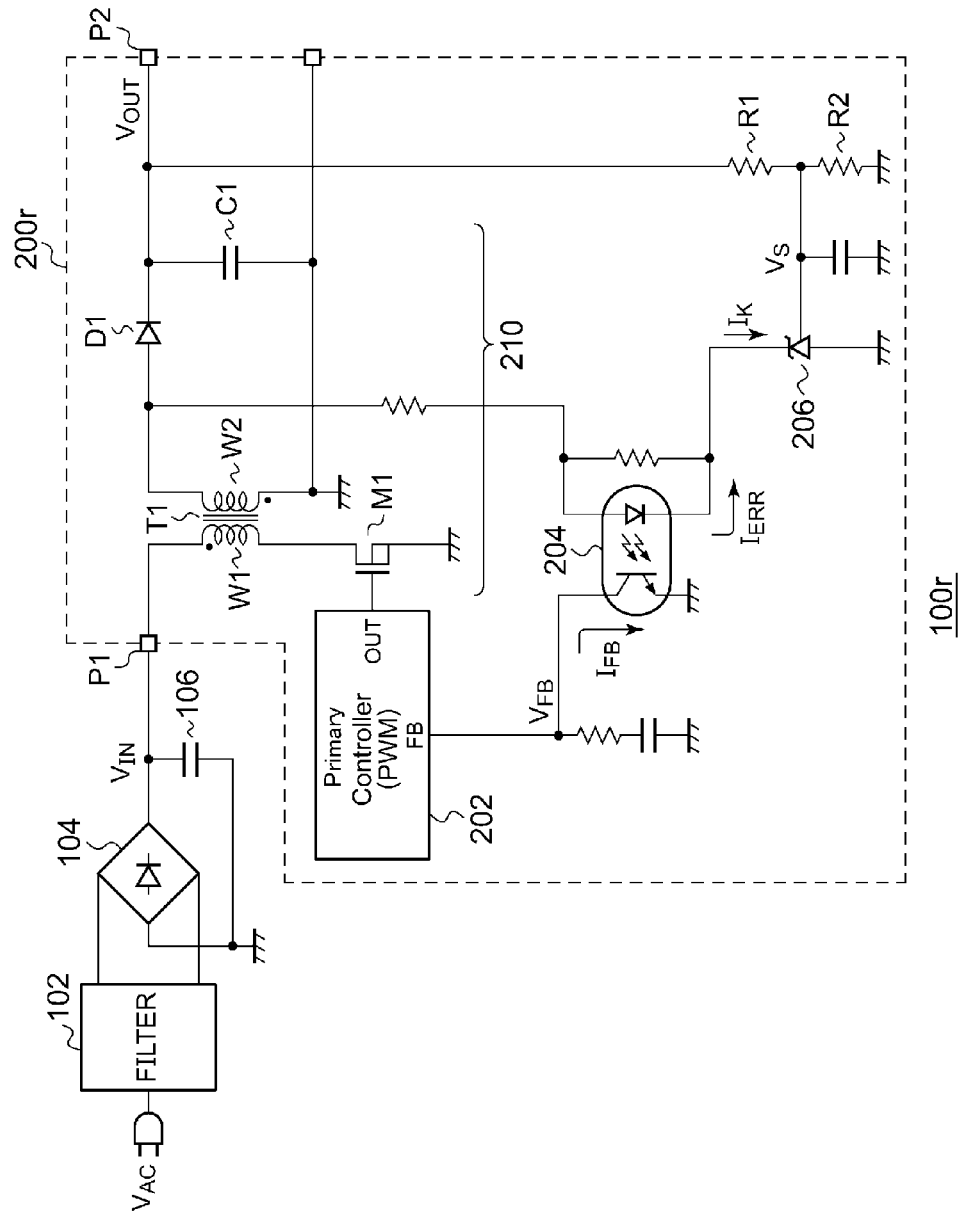
FIG. 1 is a block diagram showing an AC/DC converter investigated by the present inventor.

The conventional DC/DC converter 200r of FIG. 1 can be implemented with the shunt regulator 206. Assuming that the current consumption of the shunt regulator 206 is about 700 uA and includes 150 uA of the current flowing through the light emitting device of the photo coupler 204, and the rest 550 uA flows through the shunt regulator 206 as its operation current $I_{DD}$. It is to be noted that the operation current $I_{DD}$ flows through a parallel circuit of the light emitting device and the resistor and it leads a power loss.

To the contrary, in the circuit of FIG. 6, the operation current $I_{DD}$ of the error amplifier 310 can be reduced to about 50 uA even when its output current $I_{ERR}$ is 150 uA, which is the same amount of the shunt regulator 206, and therefore, the efficiency of the DC/DC converter 200a, especially in the light load state can be improved.

In one embodiment, the power supply terminal VCC of the synchronous rectifier controller 300a is coupled to the output line of the DC/DC converter 200a, and the synchronous rectifier controller 300a operates with the output voltage $V_{OUT}$ as its power supply voltage (for example, 24 V). Then the power consumption of the error amplifier 310 is 24 V×200 uA=4.8 mW. Conversely, assuming the same condition, the power consumption of the shunt regulator 206 in FIG. 1 is 24 V×700 uA=16.8 mW, and DC/DC converter 200a of FIG. 6 can reduce its power consumption by 10 mW in comparison with the DC/DC converter 200r of FIG. 1.

Figure 7A:
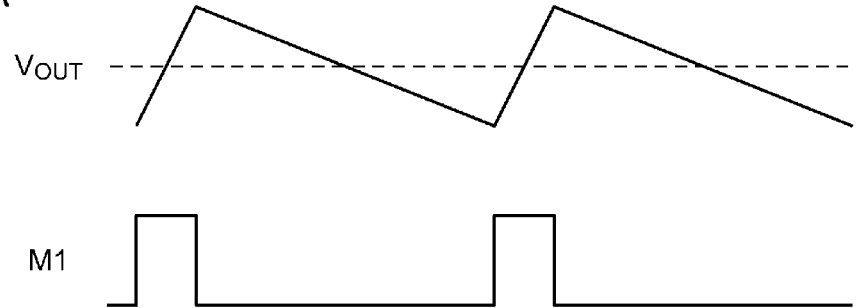
FIG. 7A is a waveform diagram showing the operation of the DC/DC converter in FIG. 6 in the PFM mode.
Figure 7B:
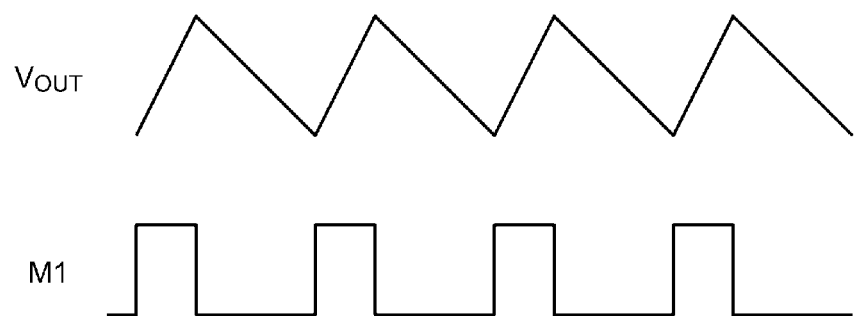
FIG. 7B is a waveform diagram showing the operation of the DC/DC converter in FIG. 1 in the PFM mode.

Further, the synchronous rectifier controller 300a provides the following advantage. In one embodiment, the DC/DC converter 200a may be operate in intermittently (referred to as PFM mode) in the light load state. FIG. 7A is a waveform diagram showing the operation of the DC/DC converter 200a in FIG. 6 in the PFM mode. FIG. 7B shows the operation of the DC/DC converter 200r in FIG. 1 in the PFM mode.

In the PFM mode, the switching transistor M1 turns off after it keeps on-state for a certain on-period $T_{ON}$. The output voltage $V_{OUT}$ becomes lower than a threshold in the vicinity of its reference level, then the switching transistor M1 turns on again.

The off-period $T_{OFF}$ of the switching transistor M1 is expressed by the equation below using the capacitance C of the output capacitor C1, a ripple $\Delta V$ of the output voltage $V_{out}$, and a discharge current I from the output capacitor C1.

$$T_{OFF} = C \times \Delta V / I$$

And the switching period t is given as the expression below.

$$t = (T_{ON} + T_{OFF}) = T_{ON} + C \times \Delta V / I$$

Here, I represents the discharge current from the output capacitor C1, and it is an equivalent of the current consumption of the shunt regulator 206 or that of the error amplifier 310. Assuming that the capacitance of the output capacitor C1 is 100 uF, the ripple ΔV is 100 mV, and $T_{ON}$=0, the switching period t1 of the DC/DC converter 200r in FIG. 1 and the switching period t2 of the DC/DC converter 200a in FIG. 6 are expressed as below.

t1≈100 uA×100 mV/700 uA=14.28 ms t2≈100 uA×100 mV/200 uA=50 ms

Accordingly, the DC/DC converter 200a of FIG. 6 can lower its switching frequency to one third in comparison with that of the DC/DC converter 200r in FIG. 1 in the light load state. That is, the switching loss required by the controller 202 for charging/discharging the gate of the switching transistor M1 is reduced to one third.

In addition, the single package including the driver circuit 302 and the error amplifier 310 simplifies the design of the DC/DC converter 200a and/or the AC/DC converter 100.

(Third Embodiment)

Figure 8:
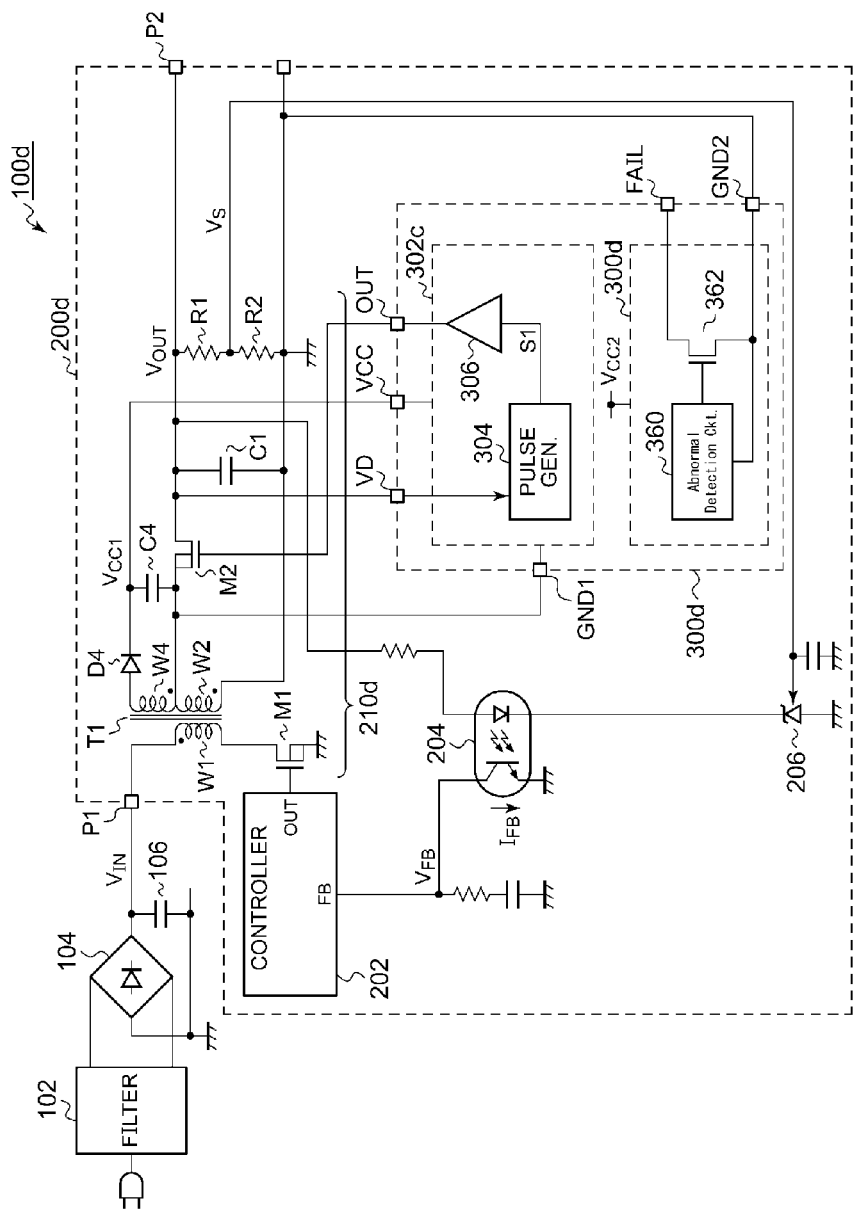
FIG. 8 is a circuit diagram of an AC/DC converter according to a third embodiment.

FIG. 8 is a circuit diagram of an AC/DC converter 100d according to a third embodiment. The synchronous rectifier transistor M2 of the output circuit 210d is provided at a high voltage side of the secondary winding W2 of the transformer T1.

The synchronous rectifier controller 300d includes a driver circuit 302d and an abnormal detection circuit 360. The basic configuration and the operation are same as those of FIG. 2. In this embodiment, a power supply plane for the driver circuit 302d and a power supply plane for the abnormal detection circuit 360 are isolated each other, and a ground plane for the driver circuit 302d and a ground plane for the abnormal detection circuit 360 are isolated each other. The driver circuit 302d and the abnormal detection circuit 360 are integrated on separate semiconductor chips (dice), and packaged in a single module. In one embodiment, the driver circuit 302d and the abnormal detection circuit 360 may be integrated on a single chip if the process design rule allows two isolated power supply planes and two isolated ground planes in the single chip.

The ground plane of the driver circuit 302d is coupled to the source of the synchronous rectifier transistor M2 via the GND1 terminal. VD terminal is coupled to the drain of the synchronous rectifier transistor M2.

An auxiliary winding W4 of the transformer T1, a diode D4 and a capacitor C4 generate a power supply voltage $V_{CC1}$ with reference to the source of the synchronous rectifier transistor M2. The power supply voltage $V_{CC1}$ is supplied to the power supply plane of the driver circuit 302d via VCC terminal of the synchronous rectifier controller 300d.

On the other hand, the ground plane of the abnormal detection circuit 360 and the transistor 362 is coupled to the ground in the secondary side via the GND2 terminal. The power supply plane of the abnormal detection circuit 360 and the transistor 362 is supplied with an internal power supply voltage $V_{CC2}$.

According to this configuration, the current consumption can be reduced as well as the first embodiment. Further, the switching loss in the light load state at the primary side can be reduced.

Additionally, in the third embodiment, the ground planes and the power supply planes are isolated between the driver circuit 302d and the abnormal detection circuit 360 respectively. Therefore, in a platform where the synchronous rectifier transistor M2 is disposed at the high voltage side, the abnormal detection circuit 360 and the transistor 362 can generate the FAIL signal S2 with the ground voltage at secondary side as its ground plane, while the driver circuit 302d drives the synchronous rectifier transistor M2 with the source voltage of the synchronous rectifier transistor M2 as its ground plane.

(Fourth Embodiment)

Figure 9:
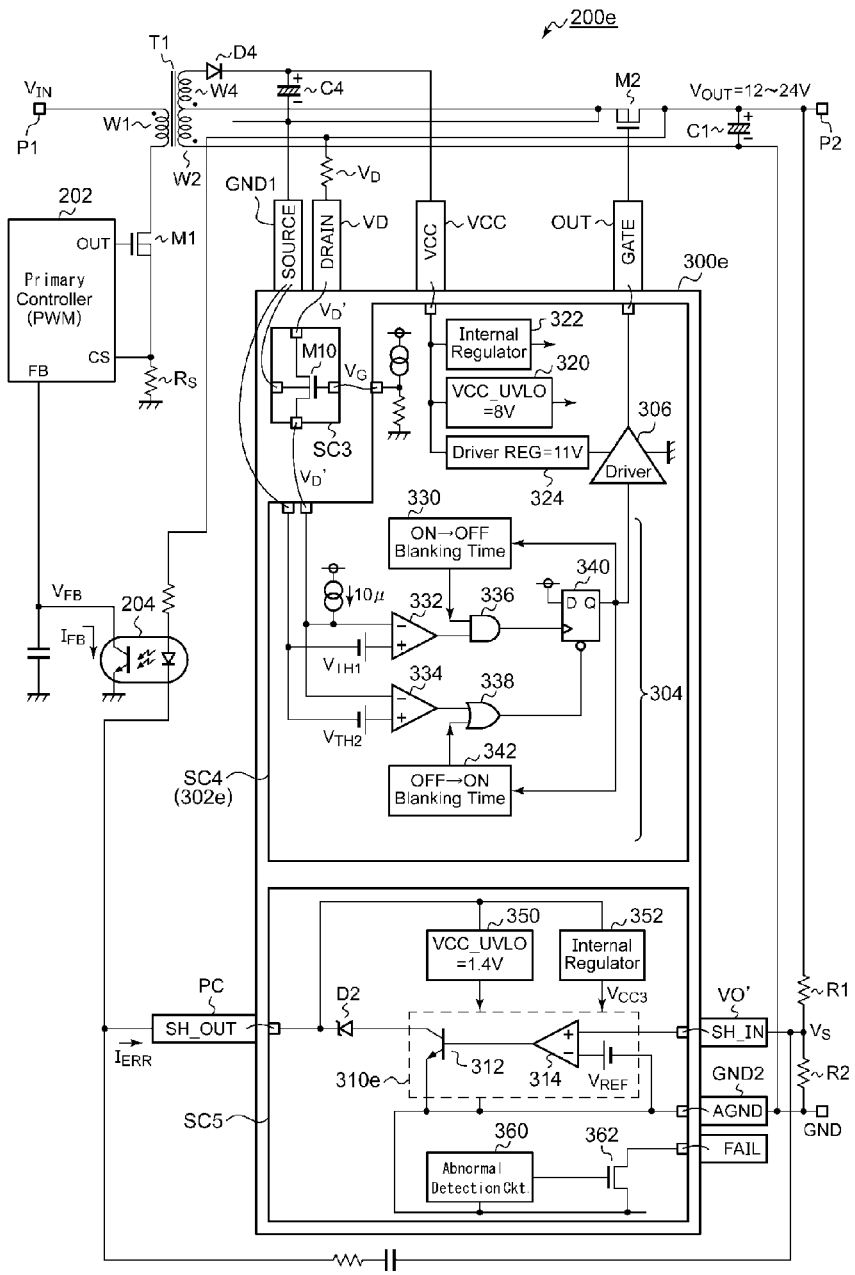
FIG. 9 is a circuit diagram of a DC/DC converter according to a fourth embodiment.

FIG. 9 is a circuit diagram of a DC/DC converter 200e according to a fourth embodiment. The synchronous rectifier controller 300e includes three semiconductor chips SC3, SC4 and SC5. The semiconductor chip SC3 is fabricated with the high-voltage process, and includes a transistor M10 configured as FET, and its gate is supplied with a predetermined bias voltage $V_C$, and clamps the drain voltage $V_D$ of the synchronous rectifier transistor M2. The clamped voltage $V_D$' by the transistor M10 is supplied to the set comparator 332 and the reset comparator 334. The semiconductor chip SC4 corresponds to the driver circuit 302d of FIG. 8, and includes the pulse generator 304 and driver 306 as shown in FIG. 5.

On the semiconductor chip SC5, the error amplifier 310e, an UVLO circuit 350, and an internal regulator 352 are integrated in addition to the abnormal detection circuit 360 and the transistor 362. The UVLO circuit 350 compares a voltage at the PC terminal (SH_OUT pin) with a predetermined threshold voltage (1.4 V), and stops the circuits on the semiconductor chip SC5 when the UVLO state is detected. The internal regulator 352 receives the voltage at the PC terminal and supplies an internal power supply voltage $V_{CC2}$ which is regulated to the error amplifier 310e and the abnormal detection circuit 360. In this embodiment, the diode D2 clamps the voltage at PC terminal above the Zener voltage Vz, and this ensures to generate the internal power supply voltage $V_{CC2}$ having a predetermined level and ensures the stable operation of the semiconductor chip SC5.

The above is the configuration of the synchronous rectifier controller 300e according to the fourth embodiment. According to the synchronous rectifier controller 300e, the current consumption can be reduced as well as the first embodiment. Further, the switching loss at the primary side in the light load state can be reduced.

Additionally, in the fourth embodiment, the ground planes and the power supply planes are isolated between the driver circuit 302e and the error amplifier 310d respectively. Therefore, in a platform where the synchronous rectifier transistor M2 is disposed at the high voltage side, the error amplifier 310e can drive the photo coupler 204 with the ground voltage at secondary side as its ground plane, while the driver circuit 302e drives the synchronous rectifier transistor M2 with the source voltage of the synchronous rectifier transistor M2 as its ground plane.

Figure 10:
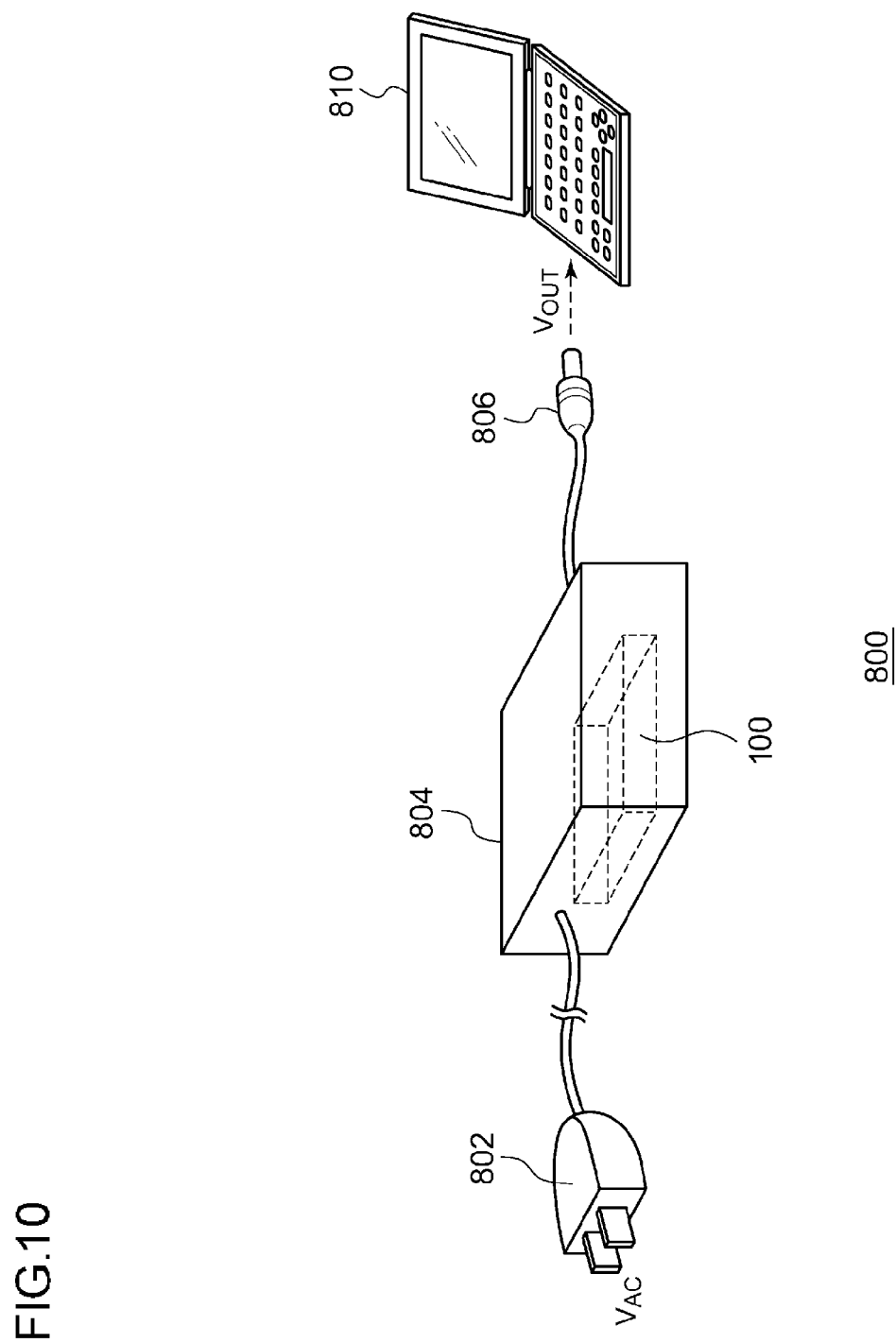
FIG. 10 is a diagram showing an AC adaptor provided with the AC/DC converter.

Next, description will be made regarding the usage of the DC/DC converter 200. FIG. 10 is a diagram showing an AC adapter 800 including the AC/DC converter 100. The AC adapter 800 includes a plug 802, a casing 804, and a connector 806. The plug 802 receives commercial AC voltage $V_{AC}$ from an unshown outlet. The AC/DC converter 100 is mounted within the casing 804. The DC output voltage $V_{OUT}$ generated by the AC/DC converter 100 is supplied to an electronic device 810 via the connector 806. Examples of such an electronic device 810 include laptop PCs, digital still cameras, digital video cameras, cellular phones, portable audio players, and the like.

Figure 11A:
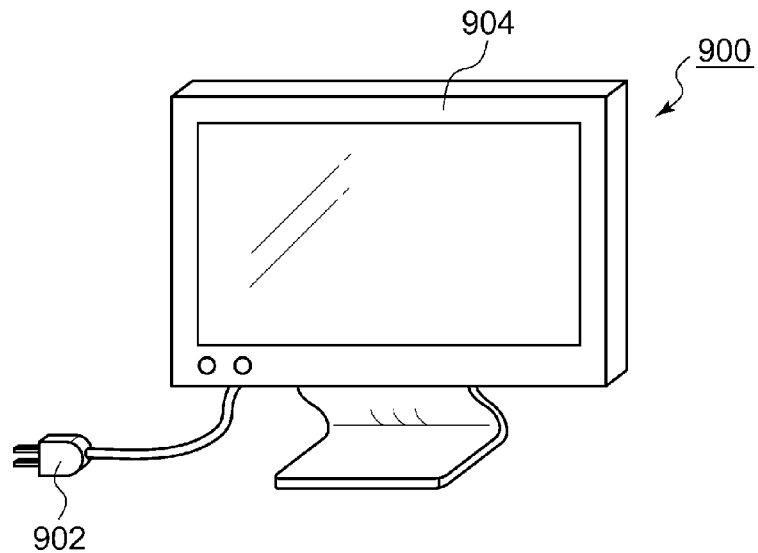
FIGS. 11A and 11B show electronic devices provided with the AC/DC converter.
Figure 11B:
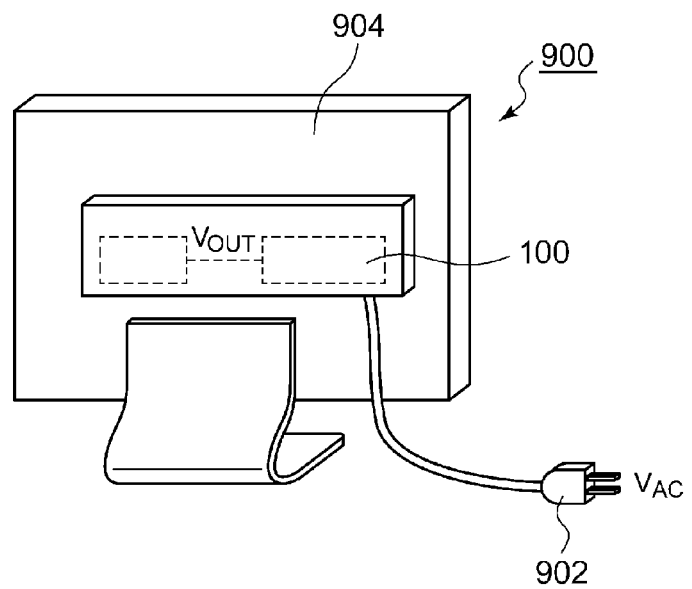

FIGS. 11A and 11B are diagrams each showing an electronic device 900 including the AC/DC converter 100. The electronic device 900 shown in FIGS. 11A and 11B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc. The plug 902 receives commercial AC voltage $V_{AC}$ from an unshown outlet. The AC/DC converter 100 is mounted within the casing 904. The DC output voltage $V_{OUT}$ generated by the AC/DC converter 100 is supplied to a load mounted in the same casing 904. Examples of such a load include microcomputers, DSPs (Digital Signal Processors), lighting devices, analog circuits, digital circuits, and the like.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

(1st Modification)

Figure 12:
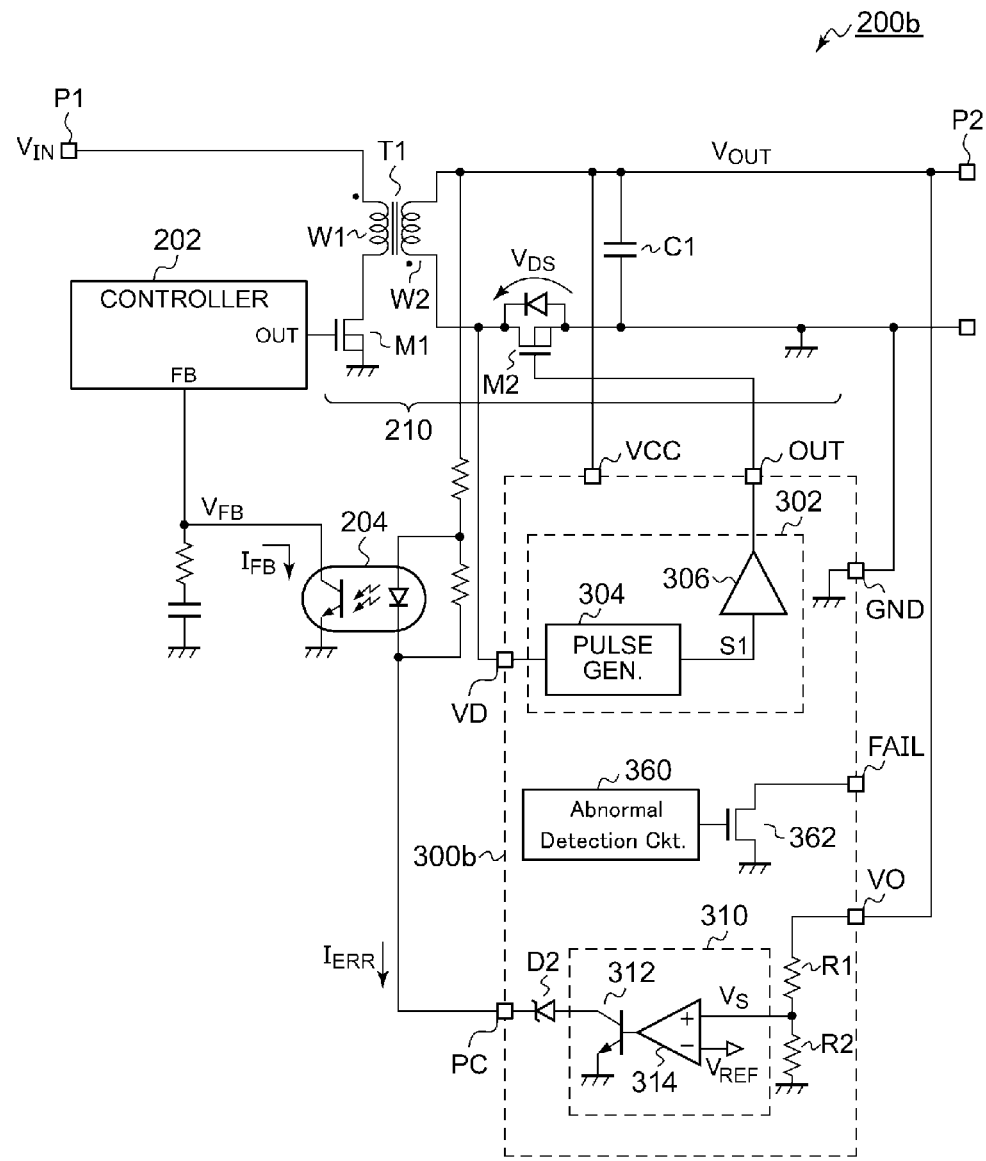
FIG. 12 is a circuit diagram of a DC/DC converter including the synchronous rectifier controller according to the first modification.

FIG. 12 is a circuit diagram of a DC/DC converter 200b including the synchronous rectifier controller 300b according to the first modification. Description will be made regarding the difference from FIG. 6. The resistors R1 and R2 are integrated on a semiconductor chip with the error amplifier 310, and are built-in the synchronous rectifier controller 300b. The resistors R1 and R2 are provided in series between VO terminal and the ground plane (ground line) of the semiconductor chip on which the error amplifier 310 are formed.

The resistor R1 and R2 are formed adjacently such that they are paired and they have the same device structure. Therefore resistances of the resistors R1 and R2 change in the same tendency for temperature change or process variation and the accuracy of the ratio between the resistances is improved.

Preferably, at least one of the first resistor R1 and the second resistor has a variable resistance which is adjustable with adjusting means such as laser trimming.

The above is the configuration of the synchronous rectifier controller 300b. The synchronous rectifier controller 300b can reduce the cost and the footprint by integrating the first resistor R1 and the second resistor R2 which would be external components in FIG. 6.

Further, the DC/DC converter 200b in FIG. 12 provides the following advantage. The output voltage $V_{OUT}$ of the DC/DC converter 200b is stabilized at the target voltage below.

$$V_{OUT}=V_{REF}\times(1+R1/R2)$$

The resistors R1 and R2 being configured as chip components, the term (1+R1/R2) varies due to the variation of the resistances, and the output voltage $V_{OUT}$ varies.

To the contrary, the term (1+R1/R2) is kept at constant value because the accuracy of the ratio R1/R2 is improved by integrating the resistors R1 and R2 on a semiconductor chip as a resistor pair. Accordingly, the stability of the output voltage $V_{OUT}$ is improved.

Further, with the adjustability of the resistance of at least one of R1 and R2, the ratio R1/R2 can be adjusted to its reference value accurately before packaging process of the synchronous rectifier controller 300b.

(2nd Modification)

Figure 13:
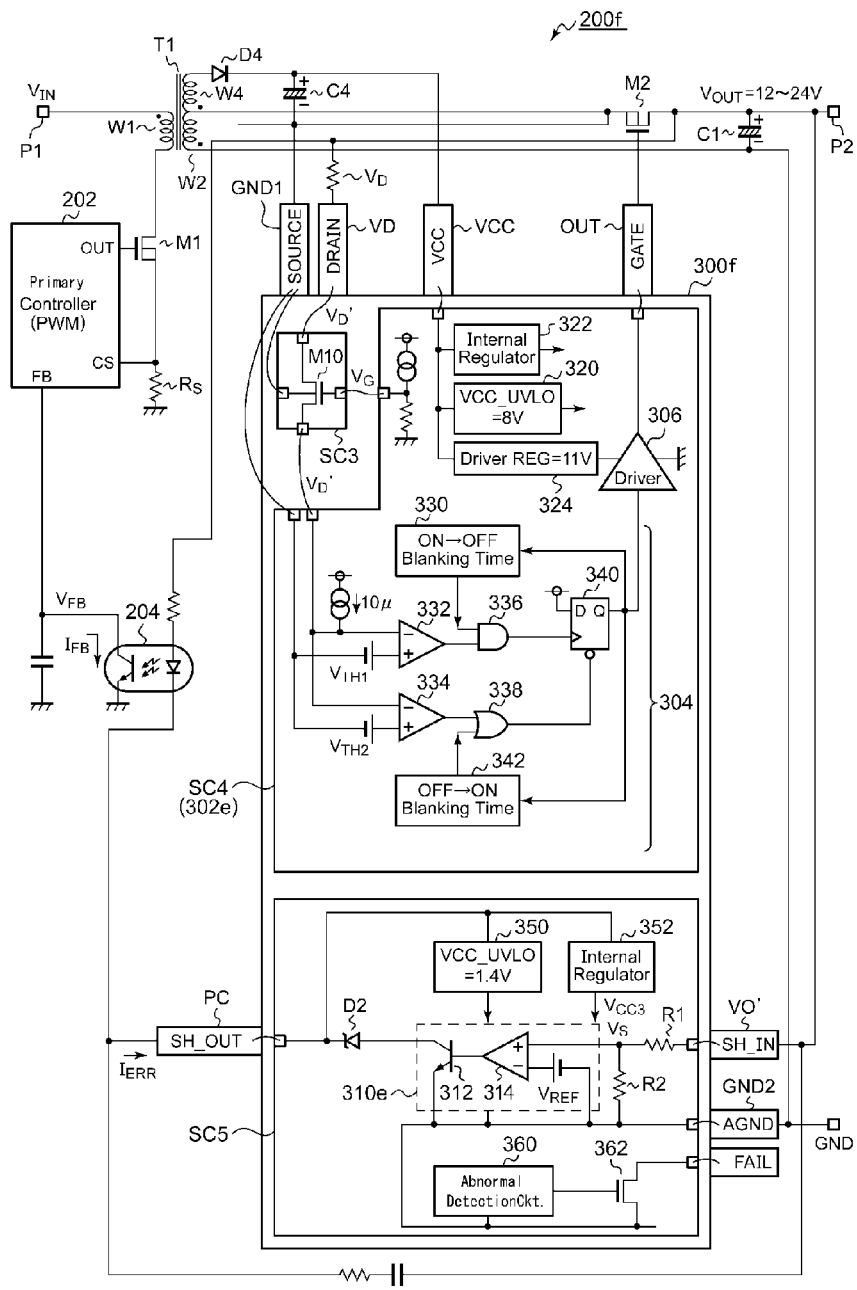
FIG. 13 is a circuit diagram of a DC/DC converter including the synchronous rectifier controller according to the second modification.

FIG. 13 is a circuit diagram of a DC/DC converter 200f including the synchronous rectifier controller 300f according to the second modification. In the synchronous rectifier controller 300f, the resistors R1 and R2 are integrated on the semiconductor chip SC5 of the synchronous rectifier controller 300e in FIG. 9. According to the synchronous rectifier controller 300f of FIG. 13, the same advantage can be obtained as the first modification.

(3rd Modification)

In FIGS. 6, 9, 12 and 13, the output transistor 312 of the error amplifier 310 may be configured as PNP bipolar transistor or P channel MOSFET. In this modification, the inverting and non-inverting input terminals of the differential amplifier 314 are interchanged each other.

(4th Modification)

In the embodiments, the present invention may be applied not only to flyback converter, but also forward converter. In the forward converter, plural synchronous rectifying transistors are provided at the secondary side of the transformer T1. In this modification, the synchronous rectifier controller may include the driver circuit 302 configured to switch the plural synchronous rectifying transistors and error amplifier 310, which are integrated in a single package. Otherwise, combination of plural synchronous rectifier controllers in FIG. 2 or FIG. 6 may support the forward converter. The converter may be a QR (Quasi-Resonant) converter.

(5th Modification)

At least one of the switching transistor and the synchronous rectifier transistor may be configured as a bipolar transistor or IGBT.

While the preferred embodiments of the present invention have been described using specific terms, such description is for illustrative purposes only, and it is to be understood that changes and variations may be made without departing from the spirit or scope of the appended claims.

What is claimed is:

1. A synchronous rectifier controller provided on a secondary side of an insulation-type synchronous DC/DC converter, wherein the insulation-type synchronous DC/DC converter supplies power to a load and comprises:
    a transformer having a primary winding and a secondary winding;
    a switching transistor coupled to the primary winding of the transformer;
    a synchronous rectifier transistor coupled to the secondary winding of the transformer;
    a feedback photo coupler; and
    a primary controller coupled to an output side of the feedback photo coupler, and structured to control the switching transistor according to a feedback signal from the feedback photo coupler,
    wherein the synchronous rectifier controller comprises:
    an output terminal structured to be coupled to a gate of the synchronous rectifier transistor;
    a driver circuit structured to be coupled to the gate of the synchronous rectifier transistor via the output terminal and structured to drive the synchronous rectifier transistor;
    an abnormal detection circuit structured to assert an abnormal detection signal when an abnormal condition in a secondary side of the DC/DC converter is detected; and
    a fail terminal via which the abnormal detection signal is output, and wherein the synchronous rectifier controller is packaged in a single module, and wherein the fail terminal is separate from the output terminal,
    wherein the abnormal detection signal output from the fail terminal is not supplied to the driver circuit, wherein the driver circuit is structured to drive the synchronous rectifier transistor independently from the abnormal detection signal; and wherein the DC/DC converter further comprises an error notifying photo coupler having an output connected to the primary controller, and wherein the fail terminal is structured to be coupled to the error notifying photo coupler for notifying the primary controller of the occurrence of the abnormal condition.

2. The synchronous rectifier controller according to claim 1, wherein the fail terminal is structured to be coupled to the load.

3. The synchronous rectifier controller according to claim 2, wherein the load comprises:
a microcontroller; and
at least one circuit controlled by the microcontroller,
and wherein the fail terminal is structured to be coupled to the microcontroller.

4. The synchronous rectifier controller according to claim 1, wherein a load switch is structured to make and break a power supply path from the DC/DC converter to the load, and the fail terminal is structured to be coupled to a control terminal of the load switch.

5. The synchronous rectifier controller according to claim 1, wherein a power supply plane of the abnormal detection circuit and a power supply plane of the driver circuit are isolated each other, and a ground plane of the abnormal detection circuit and a ground plane of the driver circuit are isolated each other.

6. The synchronous rectifier controller according to claim 5, wherein the synchronous rectifier transistor is provided at a high voltage side of the secondary winding, and the transformer further comprises an auxiliary winding provided at a secondary side, and the DC/DC converter is structured to generate, by using the auxiliary winding, an external power supply voltage with reference to a voltage potential at a line connecting the synchronous rectifier transistor to the secondary winding, and wherein the ground plane of the driver circuit is supplied with the voltage potential at the line, and the power supply plane of the driver circuit is supplied with the external power supply voltage.

7. The synchronous rectifier controller according to claim 5, further comprising:
a photo coupler connection terminal structured to be coupled to the input side of the feedback photo coupler; and
an error amplifier structured to amplify an error between a voltage detection signal according to an output voltage of the DC/DC converter and a target voltage, and to draw a current according to the error from the input side of the photo coupler via the photo coupler connection terminal, and wherein the synchronous rectifier controller is packaged in a single module.

8. The synchronous rectifier controller according to claim 7, a power supply plane and a ground plane of the error amplifier are coupled to those of the abnormal detection circuit.

9. The synchronous rectifier controller according to claim 8, wherein the power supply plane of a set of the error amplifier and the abnormal detection circuit is supplied with an internal power supply voltage which is generated from a voltage at the photo coupler connection terminal, and the ground plane of the set of the error amplifier and the abnormal detection circuit is supplied with a ground voltage at the secondary side of the DC/DC converter.

10. The synchronous rectifier controller according to claim 7, wherein the error amplifier comprises:

a differential amplifier that amplifies an error between the voltage detection signal and a target voltage; and
an output transistor having a base/a gate receiving an output signal of the differential amplifier, an emitter/a source connected to the ground, and a collector/a drain connected to the photo coupler connection terminal.

11. The synchronous rectifier controller according to claim 7, further comprising:
a voltage detection terminal structured to be coupled to receive the output voltage of the DC/DC converter; and
a first resistor and a second resistor integrated on a semiconductor chip where the error amplifier is integrated, and disposed in series between the voltage detection terminal and the ground plane.

12. The synchronous rectifier controller according to claim 6, wherein the synchronous rectifier transistor is provided at a high voltage side of the secondary winding, and the transformer further comprises an auxiliary winding provided at a secondary side, and the DC/DC converter is structured to generate, by using the auxiliary winding, an external power supply voltage with reference to a voltage potential at a line connecting the synchronous rectifier transistor to the secondary winding,
and wherein the ground plane of the driver circuit is supplied with the voltage potential at the line, and the power supply plane of the driver circuit is supplied with the external power supply voltage.

13. The synchronous rectifier controller according to claim 7, wherein the error amplifier and the driver circuit are integrated on separate semiconductor chips.

14. The synchronous rectifier controller according to claim 5, further comprising the synchronous rectifier transistor and wherein the synchronous rectifier controller is packaged in a single module.

15. The synchronous rectifier controller according to claim 1, wherein the abnormal detection circuit is structured to detect at least one of an over voltage condition and an overheated condition in the secondary side.

16. An insulation-type synchronous DC/DC converter comprising:
a transformer having a primary winding and a secondary winding;
a switching transistor coupled to the primary winding of the transformer;
a synchronous rectifier transistor coupled to the secondary winding of the transformer;
an output capacitor;
a feedback photo coupler;
a synchronous rectifier controller structured to control the synchronous rectifier transistor and to drive the photo coupler with a current according to an error between the voltage at the output capacitor and a target voltage; and
a primary controller coupled to an output side of the feedback photo coupler, and structured to control the switching transistor according to a feedback signal from the feedback photo coupler,
wherein the synchronous rectifier controller comprises:
an output terminal structured to be coupled to a gate of the synchronous rectifier transistor;
a driver circuit structured to be coupled to the gate of the synchronous rectifier transistor via the output terminal and structured to drive the synchronous rectifier transistor;

an abnormal detection circuit structured to assert an abnormal detection signal when an abnormal condition in a secondary side of the DC/DC converter is detected; and a fail terminal via which the abnormal detection signal is output, and wherein the synchronous rectifier controller is packaged in a single module, and wherein the fail terminal is separate from the output terminal;

wherein the abnormal detection signal output from the fail terminal is not supplied to the driver circuit, wherein the driver circuit is structured to drive the synchronous rectifier transistor independently from the abnormal detection signal; and the DC/DC converter further comprises an error notifying photo coupler having an output connected to the primary controller, and wherein the fail terminal is structured to be coupled to the error notifying photo coupler for notifying the primary controller of the occurrence of the abnormal condition.

17. A power supply apparatus comprising:
a filter structured to filter a commercial AC voltage;
a diode rectifier circuit structured to full-wave rectify an output voltage of the filter;
a smoothing capacitor coupled to smooth an output voltage of the diode rectifier circuit, so as to generate a DC input voltage; and
the insulation-type synchronous DC/DC converter according to claim 16, configured to step down the DC input voltage, and to supply the DC input voltage thus stepped down to a load.

18. An electronic device comprising:
a load;
a filter structured to filter a commercial AC voltage;
a diode rectifier circuit structured to full-wave rectify an output voltage of the filter;
a smoothing capacitor coupled to smooth an output voltage of the diode rectifier circuit, so as to generate a DC input voltage; and
the insulation-type synchronous DC/DC converter according to claim 16, configured to step down the DC input voltage, and to supply the DC input voltage thus stepped down to the load.

19. A power supply adapter comprising:
a filter structured to filter a commercial AC voltage;
a diode rectifier circuit structured to full-wave rectify an output voltage of the filter;
a smoothing capacitor coupled to smooth an output voltage of the diode rectifier circuit, so as to generate a DC input voltage; and
the insulation-type synchronous DC/DC converter according to claim 16, configured to step down the DC input voltage, and to generate the DC input voltage thus stepped down.

* * * * *